May 15, 1928.
C. F. HOOFER
LUBRICATING DEVICE
Filed June 6, 1924
1,669,615
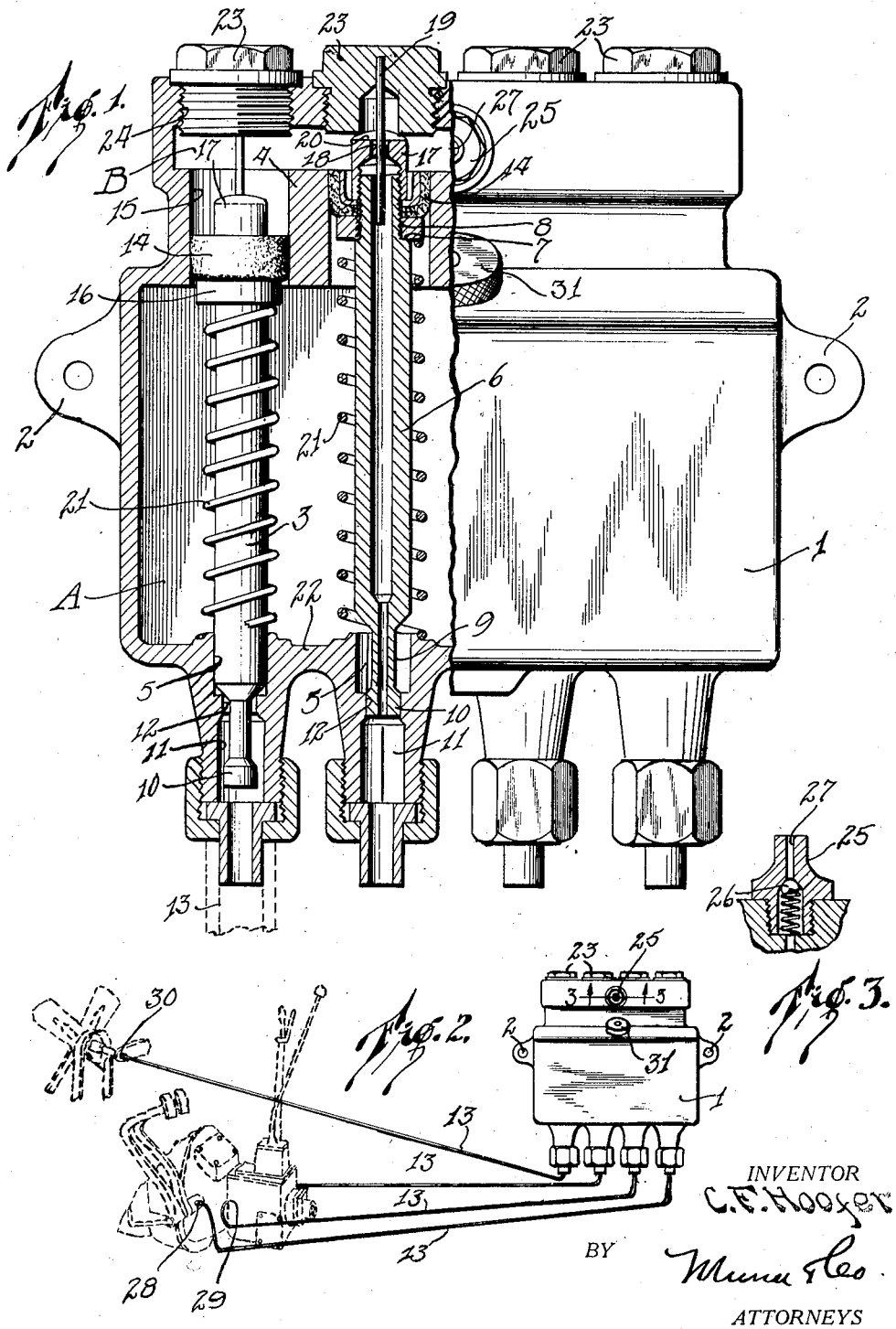

Patented May 15, 1928.

1,669,615

UNITED STATES PATENT OFFICE.

CHARLES F. HOOFER, OF CHICAGO, ILLINOIS.

LUBRICATING DEVICE.

Application filed June 6, 1924. Serial No. 718,341.

My invention relates to improvements in lubricating devices and it consists in the combinations, constructions, and arrangements herein described and claimed.

An object of my invention is to provide a lubricating device which is especially adapted for automobiles and the like, and which may be quickly secured to a standard car with but slight alterations being necessary in the latter.

A further object of my invention is to provide a lubricating device in which a predetermined quantity of oil or grease is forced into the various parts of a car which needs oiling, this oiling being accomplished by compressed air, thus providing a means for conveying the oil to the parts desired.

A further object of my invention is to provide a lubricating device in which the entire plunger may be removed from the device from the top of the casing thereby obviating the disadvantage of having to first drain the oil from the casing before the plungers are removed from the device.

A further object of my invention is to provide a lubricating device in which the springs for holding the plungers in their uppermost position extend the entire length of the plunger rods, thus providing a construction in which there is very little difference in the tension of the springs whether they are in expanded or contracted position.

A further object of my invention is to provide a lubricating device in which only a predetermined quantity of oil is delivered at a given time, even though the compressed air which actuates the plungers is left on for a considerable time, the device being constructed so as to permit the compressed air to flow through the oil pipes that lead from the device to the various parts of the car and force this oil to these parts.

Other objects and advantages will appear in the following specification, and the novel features of the invention will be particularly pointed out in the appended claims.

Figure 1 is a front elevation of the device, portions thereof being broken away.

Figure 2 is a diagrammatic view of the device, showing some of the oil pipes connected to various parts of the car, which are shown diagrammatically, and Figure 3 is a sectional view along the line 3—3 of Figure 2.

In carrying out my invention I provide a casing 1 which has lugs 2 by means of which the casing is adapted to be secured to a car. The device is of a size that it may be readily disposed beneath the hood of a car whereby a person can readily get at the device so as to apply the compressed air hose thereto and force a given quantity of oil into the various parts of the car. It is obvious that the device may be disposed at any place desired other than that just described.

The casing is divided into two main compartments—A and B, the compartment A receiving oil or grease, while the compartment B is for the compressed air. Plungers 3 are slidably carried by the casing, and are adapted to be actuated when compressed air is admitted to the compartment B. In Figure 1 it will be apparent that the plungers 3 extend from a partition 4, that separates the compartment A from the compartment B, and project into an oil receiving recess 5. The plunger consists of a hollow rod 6 which has a shoulder 7 adjacent to its upper end, and a portion 8 that extends from the shoulder 7 to the free end of the rod 6. The rod 6 is provided with an annular groove 9 and with an enlarged portion 10 at its lowermost end. The recess 5 is in communication with a compartment 11, by means of a reduced passageway 12. This passageway is of the same diameter as the outer diameter of the projection 10. The plunger in cross section shows the projection 10 as being received in the reduced portion 12, while the plunger shown in elevation shows the projection 10 as being disposed in the compartment 11 when the bottom of the rod 6 is received in the recess 5. The plunger shown in elevation is in its lower-most position, while the plunger shown in cross-section is in its upper-most position.

The novel construction of the lower end of the plunger 6 and the novel construction of the recess 5, reduced portion 12, and compartment 11, affords a means for delivering a predetermined quantity of oil to the pipes 13 each time the plungers are actuated.

The upper ends of the plungers 3 are provided with a pump leather 14 that is slidably received in a bore 15 in the partition 4. The pump leathers 14 are secured in place by means of a lock nut 16, and a cap 17. The cap 17 has a hollow bore and is screwed to the threaded end of the rods 6. The caps have openings 18 which are adapted to receive the cleaning wires 19 and which are adapted to allow the compressed air to flow from the chamber B into the bore of the rods 6. The upper end of the cap 17 is provided with a kerf which permits the cap to be secured into place and which also acts as an air passageway for allowing the air to flow from the compartment B into the rods 6. A spring 21 is disposed on each of the rods 6 and bears against the bottom 22 of the compartment A and against the lock nuts 16.

The cleaning wires 19 are carried by caps 23, these caps being received in openings 24 in the top of the casing 1. The diameter of the openings 24 is large enough to permit the rods 6 with their attachments to be removed from the casing 1.

From the foregoing description of the various parts of the device the operation thereof may be readily understood. An automatic valve 25, shown in Figure 3, connects with the compartment B and is adapted to receive the ends of the compressed air hose (not shown), whereby compressed air is admitted to the compartment B. The valve 25 has a spring pressed ball 26 which closes the opening 27 in the valve as soon as the compressed air hose has been moved from the valve. In Figure 2 I have shown diagrammatically how the pipes 13 lead from the casing 1 and are connected to various parts of the automobile, such as the shaft for the pedals shown at 28, the clutch collar, shown at 29 and the fan bearing shown at 30. It is obvious that as many plungers 3 as desired may be employed in the casing 1 and therefore any number of pipes 13 may lead from the casing to the various parts of the car.

In operation the compartment A is filled with oil through the inlet cap 31. All of the plungers 3 are in the position shown by the right-hand plunger in Figure 1. The plunger, when in this position, allows the oil or grease to enter the recess 5. If now the compressed air hose is attached to the valve 25 the air will flow into the compartment B through the kerf 20 of each of the caps 17, thence through the opening 18 in the cap and on through the bores in the rods 6. The air will also move the plunger into the position shown by the left-hand plunger in Figure 1, this movement being accomplished by the air striking the pump leathers 14 and forcing the plungers 3 downwardly. As soon as the plungers start on their downward stroke the portions of the rods 6 adjacent to the reduced portions 9 will enter the tops of the recesses 5 and will prevent any more oil from entering the recesses 5 during the downward movement of the plungers on the down stroke. It should be noted that the tops of the recesses 5 are closed by the rods 6 before the portions 10 are moved free of the reduced portions 12. When the plungers have been moved into their lowermost position the oil in the recesses 5 will be emptied into the compartment 11 that connects with the pipes 13. The compressed air flowing through the rods 6 will now convey the oil that is in the compartments 11 through the pipes 13 and through the various parts of the car to which the pipes are connected. The air hose may be kept on the valve 25 as long as desired, so as to force all of the oil through the various parts of the car. As heretofore stated any predetermined quantity of oil is delivered to the various parts of the car even though the compressed air hose remains on the valve 25 for a considerable length of time.

The springs 21 are compressed to a slight extent when the plungers are moved downwardly, but the tension of the springs is not materially increased. This downward movement is due to the fact that the springs are quite long. A further advantage derived from using long springs rather than short springs, as shown in the co-pending application, Serial No. 491,424, filed on August 11, 1921, is that the plunger rods 6 do not have to be provided with the shoulder upon which the upper ends of the springs 21 bear. The springs 21 bear against the under sides of the lock nuts 16. This reduces the cost of manufacturing the device. As heretofore stated, the openings 24 are large enough to permit the plungers to be removed through the top of the casing 1 if it is desired to repair the device in any way. The valve 25 is instantly closed as soon as the air hose is removed therefrom, thereby causing all of the compressed air which is reserved in the compartment B to be used in forcing the plungers downwardly and in conveying the oil through the oil pipes 13.

I claim:

1. In a device of the type described, a cylinder, means for admitting air to said cylinder, a hollow rod slidably mounted in said cylinder and adapted to have air pass therethrough, a cap secured to the end of said rod and having an opening therein, a screw plug carried by said cylinder and having a recess therein, facing in the direction of said cap, and a flexible wire secured to said plug and being adapted to be loosely received in the opening in said cap and to extend into the bore of said rod, whereby the movement of said rod with respect to said wire loosens the foreign matter lodged around the wire and inner wall of the bore so as to permit the air to force the foreign matter through the hollow rod.

2. In a device of the type described, a cylinder, means for admitting air to said cylinder, a hollow rod slidably mounted in said cylinder, a cleaning wire slidably disposed in said hollow rod, means for supporting said cleaning wire, whereby the movement of said rod with respect to said wire loosens the foreign matter lodged around the wire and inner wall of the bore in said rod, so as to permit the air to force the foreign matter through the hollow rod.

3. In a lubricating device, a casing having an oil holding compartment and an air compartment, a hollow plunger extending through said oil holding compartment and communicating at its top with said air compartment, a stationary member extending into the upper end of said plunger, a valve carried by the lower end of said plunger for controlling the flow of oil, and means for reciprocating the plunger, whereby oil is fed from the oil holding compartment, the movement of said plunger with respect to the stationary member serving to dislodge any accumulation in the upper end of the hollow plunger.

4. In a lubricating device, a casing having a chamber for motive fluid, a movable plunger having an end exposed to the fluid pressure within said chamber and being provided with a passageway for the flow of a portion of the motive fluid, and a stationary member carried by the casing and arranged to extend into said passageway for forming a constriction for said passageway and for keeping the constricted passage clear.

5. In a lubricating device, a casing having a chamber for motive fluid, one wall of the chamber being provided with a bore, a movable plunger having a portion slidably disposed within the bore and being provided with a passageway for the flow of a portion of the motive fluid, said casing being provided with an opening registering with said bore on the opposite wall of the chamber, a cap removably disposed in said opening, and a stationary member carried by the cap and arranged to extend into the passageway for forming a constriction for said passageway and for keeping the constricted passage clear.

6. In a lubricating device, a casing having a chamber for motive fluid, one wall of the chamber having a bore and the opposite wall having a threaded opening in registration with said bore, a plunger having a portion slidably disposed within the bore and being provided with a passageway for the flow of a portion of the motive fluid, a screw cap arranged to close the threaded opening, a wire carried by the screw cap and having its longitudinal axis coinciding with the axis of the screw cap and the passageway and being arranged to extend into said passageway for forming a constriction for said passageway and for keeping the constricted passage clear.

CHARLES F. HOOFER.